(12) United States Patent
Parker

(10) Patent No.: US 8,858,171 B2
(45) Date of Patent: Oct. 14, 2014

(54) BEARING ASSEMBLY

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 582 days.

(21) Appl. No.: 12/998,909

(22) PCT Filed: Jan. 14, 2010

(86) PCT No.: PCT/GB2010/050053
§ 371 (c)(1),
(2), (4) Date: Jun. 15, 2011

(87) PCT Pub. No.: WO2010/084338
PCT Pub. Date: Jul. 29, 2010

(65) Prior Publication Data
US 2012/0006939 A1 Jan. 12, 2012

(30) Foreign Application Priority Data
Jan. 20, 2009 (GB) .................................. 0900822.8

(51) Int. Cl.
*F01D 25/00* (2006.01)
*F15B 15/14* (2006.01)
*B64C 13/42* (2006.01)

(52) U.S. Cl.
CPC ............. *B64C 13/42* (2013.01); *F15B 15/1404* (2013.01)
USPC ........................................ 415/229; 244/99.5

(58) Field of Classification Search
CPC ... B64D 27/26; B64D 2027/266; B64D 13/42
USPC ........... 244/99.5, 99.3, 99.2, 99.7; 415/170.1, 415/229; 384/192, 206, 208, 209
See application file for complete search history.

(56) References Cited

U.S. PATENT DOCUMENTS

| 3,359,994 | A | * | 12/1967 | Lapointe | ..................... 137/15.04 |
| 3,593,620 | A |   | 7/1971  | Foerster et al. | |
| 3,662,550 | A |   | 5/1972  | Lichtfuss | |
| 3,874,619 | A | * | 4/1975  | Collins et al. | .................... 244/50 |
| 4,231,284 | A |   | 11/1980 | Smith et al. | |
| 4,784,355 | A |   | 11/1988 | Brine | |

FOREIGN PATENT DOCUMENTS

| DE | 28 51 878 | 3/1980 |
| EP | 1 016 589 | 7/2000 |
| EP | 1 985 893 | 10/2008 |

(Continued)

OTHER PUBLICATIONS

International Search Report for PCT/GB2010/050053, mailed Aug. 6, 2010.

(Continued)

*Primary Examiner* — Rob Swiatek
*Assistant Examiner* — Timothy Schwarz
(74) *Attorney, Agent, or Firm* — Nixon & Vanderhye P.C.

(57) ABSTRACT

A bearing assembly for mounting a pair of spaced parallel actuators between a wing and a control surface of an aircraft so that the actuators control deployment of the control surface from the wing in tandem. The bearing assembly includes a fixed member for attachment to the aircraft and a movable member attachable to the actuators. The fixed and movable members are coupled via a part-spherical bearing and are configured such that the part-spherical bearing is located in the space between the actuators.

16 Claims, 4 Drawing Sheets

(56) References Cited

FOREIGN PATENT DOCUMENTS

| | | |
|---|---|---|
| GB | 1 068 361 | 5/1967 |
| JP | 49-20439 | 5/1974 |
| JP | 55-33972 | 3/1980 |
| JP | 62-237104 | 10/1987 |
| JP | 04-296204 | 10/1992 |
| JP | 5-52353 | 7/1993 |
| JP | 7-4902 | 1/1995 |
| JP | 10-078009 | 3/1998 |
| JP | 2004-196115 | 7/2004 |
| JP | 2005-170131 | 6/2005 |
| RU | 2 210 681 | 8/2003 |

OTHER PUBLICATIONS

Written Opinion for PCT/GB2010/050053, mailed Aug. 6, 2010.
Search Report for GB 0900822.8, dated May 20, 2009.
Database WPI Week 199822, *Thomson Scientific*, XP002593965, Mar. 24, 1998, 1 page.
English translation of Chinese Office Action dated Jul. 3, 2013 in CN 201080004204.2.
Japanese Office Action mailed Nov. 5, 2013 in JP 2011-545800 and English translation.

* cited by examiner

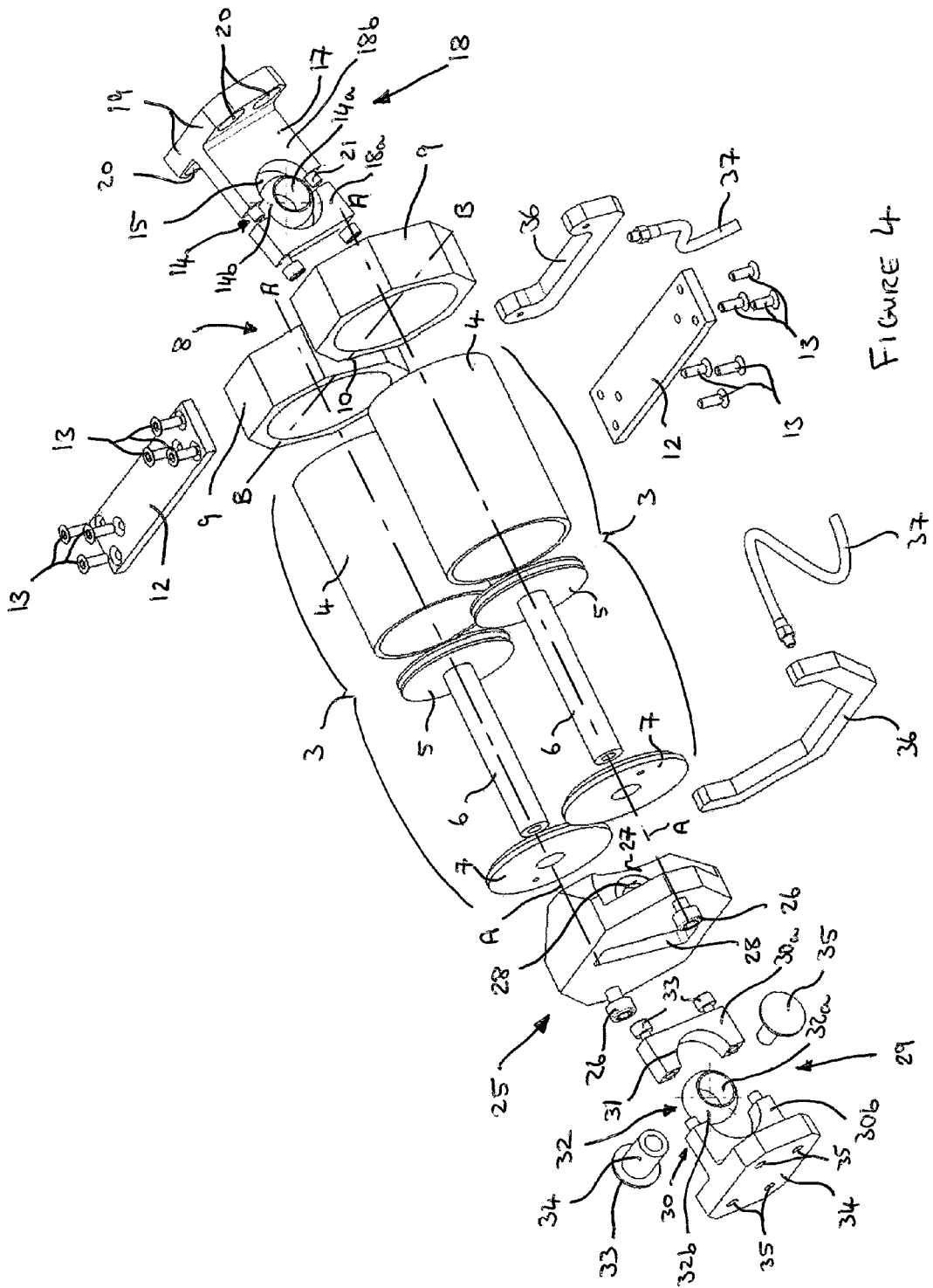

BEARING ASSEMBLY

This application is the U.S. national phase of International Application No. PCT/GB2010/050053 filed 14 Jan. 2010 which designated the U.S. and claims priority to GB Patent Application No. 0900822.8 filed 20 Jan. 2009, the entire contents of each of which are hereby incorporated by reference.

INTRODUCTION

The present invention relates to a bearing assembly for mounting an actuator to an aircraft wing and to an actuator system assembly comprising the bearing assembly of the invention and the actuators.

BACKGROUND

Aircraft need to produce varying levels of lift for take-off, landing and cruise. A combination of wing leading and trailing edge control surfaces are used to control the wing coefficient of lift. The leading edge control surface is known as a slat and a trailing edge control surface is known as a flap. During normal flight the slats and flaps are retracted against the leading and trailing edges of the wing, respectively. However, during take-off and landing they are deployed from the wing so as to vary the airflow across and under the wing surfaces. By varying the extent to which the slats and flaps are deployed from the wing, the lift provided by the wing can be controlled. Other trailing edge control surfaces include ailerons and spoilers.

The control surfaces are moved using hydraulic actuators mounted within the wing structure and coupled at each end to the wing and to the control surface via spherical bearing assemblies at both ends of the actuator.

As demands for thinner, more efficient wing profiles increase, it becomes increasingly difficult to fit all the necessary systems, structure and actuation devices within the wing outer mould line and the size of actuator that may be employed for controlling deployment of various control surfaces is severely limited. In particular, the length of conventional hydraulic cylinders is a problem, especially as the spherical bearing at each end of the actuator each add between 50 to 200 mm to the length of the actuator which is often unacceptable due to the tight space constraints within the wing structure.

To address the problems referred to above, it is known to employ trunion mounted cylinders as these are shorter in length. However, as these actuators rely on only one spherical bearing at the moving end of the hydraulic cylinder, the fixed end of the actuator is mounted for movement about one axis, and so they suffer from high wear on the cylinder bushes and seals resulting in premature failure due to hyperstatic loading caused by wing bending and manufacturing tolerances. Therefore, regular inspection and maintenance is necessary to avoid a potential failure.

It is therefore desirable to provide an assembly in which the actuator is mounted via a spherical bearing at both ends but which does not have the additional length suffered by conventional bearing assemblies. Embodiments of the present invention therefore seek to provide an actuator which substantially overcomes or alleviates the known problems with conventional bearing assemblies and to provide an actuator of reduced length that can withstand hyperstatic loads caused by wing bending.

SUMMARY OF THE INVENTION

According to the invention, there is provided a bearing assembly for mounting a pair of spaced parallel actuators between a wing and a control surface of an aircraft so that the actuators control deployment of said control surface from the wing in tandem, the bearing assembly comprising a fixed member for attachment to the aircraft and a movable member attachable to the actuators, wherein the fixed and movable members are coupled via a part-spherical bearing and are configured such that the part-spherical bearing is located in the space between the actuators.

Each actuator may comprise a hydraulic cylinder and a piston slideably received in the cylinder. The bearing assembly preferably comprises a first movable support member attachable to the hydraulic cylinders to couple each actuator together in spaced parallel relation, said first movable support member including a shaft that extends across the space between the cylinders and a first part-spherical bearing being mountable to said shaft.

In a preferred embodiment, a first fixed support member comprises an arm that extends into the space between the cylinders, the arm having an opening that forms a bearing seat to receive the first part-spherical bearing mounted on the shaft of the first movable support member such that the fixed and movable support members are rotatable relative to each other about the first part-spherical bearing.

The arm of the first fixed support member may be formed in two separable parts that combine to form the bearing seat and enclose the first part-spherical bearing.

In one embodiment, the first fixed support member has a flange at one end remote from the bearing seat, the flange having means to enable the arm to be fixed to the aircraft.

Preferably, the first movable support member comprises a collar at each end of the shaft to receive a cylinder of each actuator in respective collars.

A reinforcing plate may be coupled to, and extend between, each collar.

In a preferred embodiment, a second movable support member is attachable to the free end of each piston extending from their respective cylinders such that the pistons slide in unison into and out of their respective cylinders.

The second movable support member may have a central region that extends between the pistons and an aperture extending through said central region to receive and mount a second part-spherical bearing between said pistons.

The central region preferably has a hole in the central region to receive and mount a pin extending laterally through the aperture, the second part-spherical bearing being mountable on the pin.

In a preferred embodiment, a second fixed support member comprises an arm configured to extend into the aperture in the central region of the second movable support member, the arm having an opening that forms a bearing seat to receive the second part-spherical bearing mounted in said aperture in the second movable support member such that the second fixed and movable support members rotate relative to each other about the second part-spherical bearing.

The arm of the second fixed support member may be formed in two separable parts that combine to form the bearing seat and enclose the second part-spherical bearing.

Preferably, the second fixed support member has a flange at one end remote from the bearing seat, the flange having means to enable the arm to be attached to the aircraft.

In a preferred embodiment the bearing assembly comprises a manifold to fluidly connect a single fluid source to both cylinders. Preferably, a separate manifold is mountable at each end of the pair of cylinders.

The ends of each cylinder may be closed by a plate and the manifold is attachable to the plates at one end of the pair of cylinders so as to extend therebetween, the plates each having a passage therethrough to fluidly connect the manifold to the cylinders.

According to another aspect of the invention, there is provided an actuator system comprising the bearing assembly of the invention, the actuator system comprising a pair of spaced parallel cylinders each having a piston slideably received therein, a first movable support member being mounted to said cylinders and having a first part spherical bearing mounted on a shaft extending therebetween, a first fixed support member being coupled to said first part spherical bearing such that the first fixed and movable support members are rotatable relative to each other about said first part-spherical bearing.

In a preferable embodiment, the second movable support member is mounted to the free end of each piston and a second part-spherical bearing is mounted in the aperture in the central region of said second movable support member, the second fixed support member extending into said aperture and being coupled to the second-part spherical bearing such that the second fixed and movable support members are rotatable relative to each other about the second part-spherical bearing.

In one embodiment, a spring element is disposed in each cylinder to bias the pistons to a neutral position in the absence of hydraulic pressure acting on the pistons.

In one embodiment, the first fixed support member is mountable to an aircraft wing and the second fixed support member is mountable to a control surface.

In another embodiment, the first fixed support member is mountable to a control surface and the second fixed support member is mountable to an aircraft wing.

According to another aspect of the invention, there is provided an aircraft wing and a control surface coupled to said wing for deployment during take-off and/or landing, and an actuator system according to the invention extending between and coupled to said control surface and the wing to control deployment of said control surface from said wing.

BRIEF DESCRIPTION OF THE DRAWINGS

Embodiments of the invention will now be described, by way of example only, and with reference to the accompanying drawings, in which:

FIG. 4 is an exploded perspective view of the actuator system shown in FIGS. 1 to 3.

DESCRIPTION OF THE PREFERRED EMBODIMENTS

Figure 1:
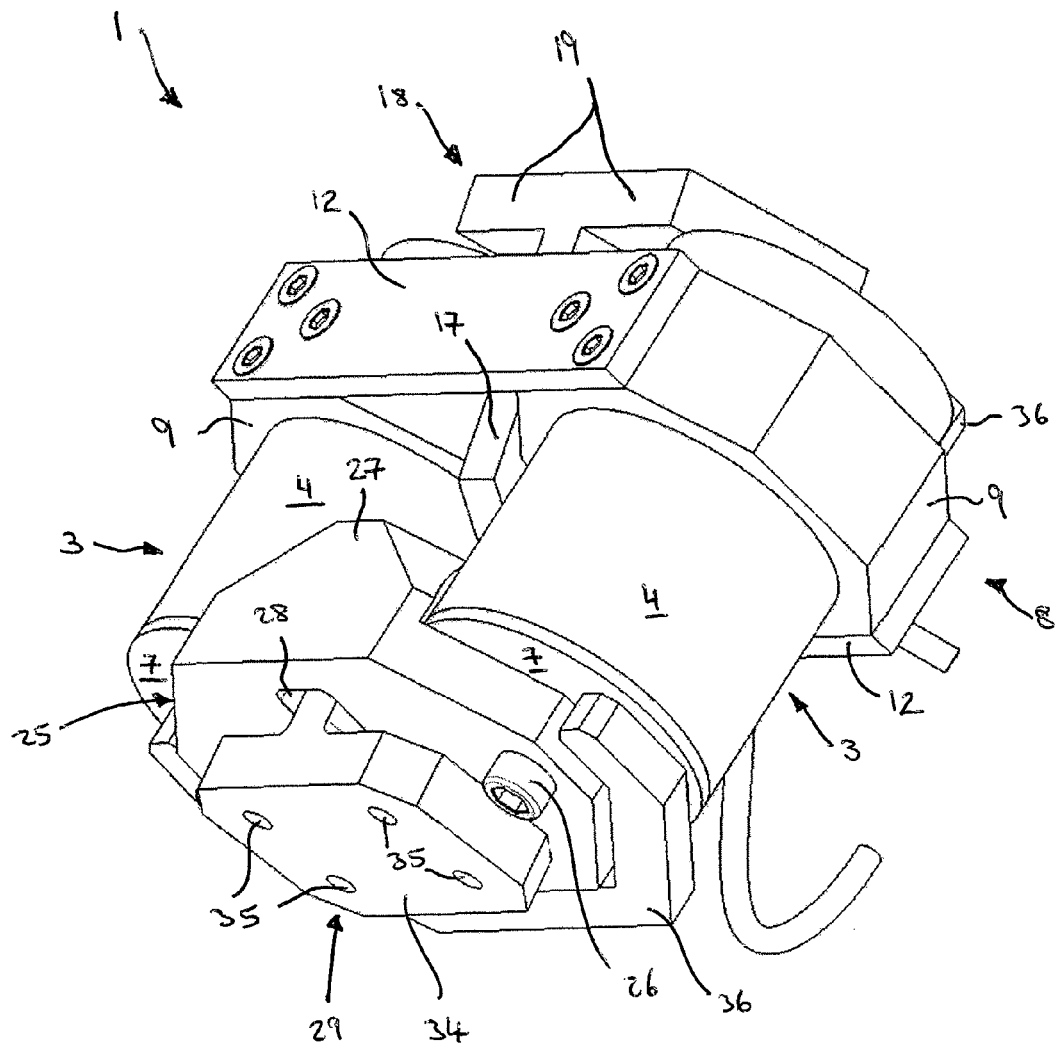
FIG. 1 is a front perspective view of an actuator system assembly according to the invention, including the bearing assembly of the invention, with the pistons of the hydraulic cylinders shown in a retracted state.
Figure 2:
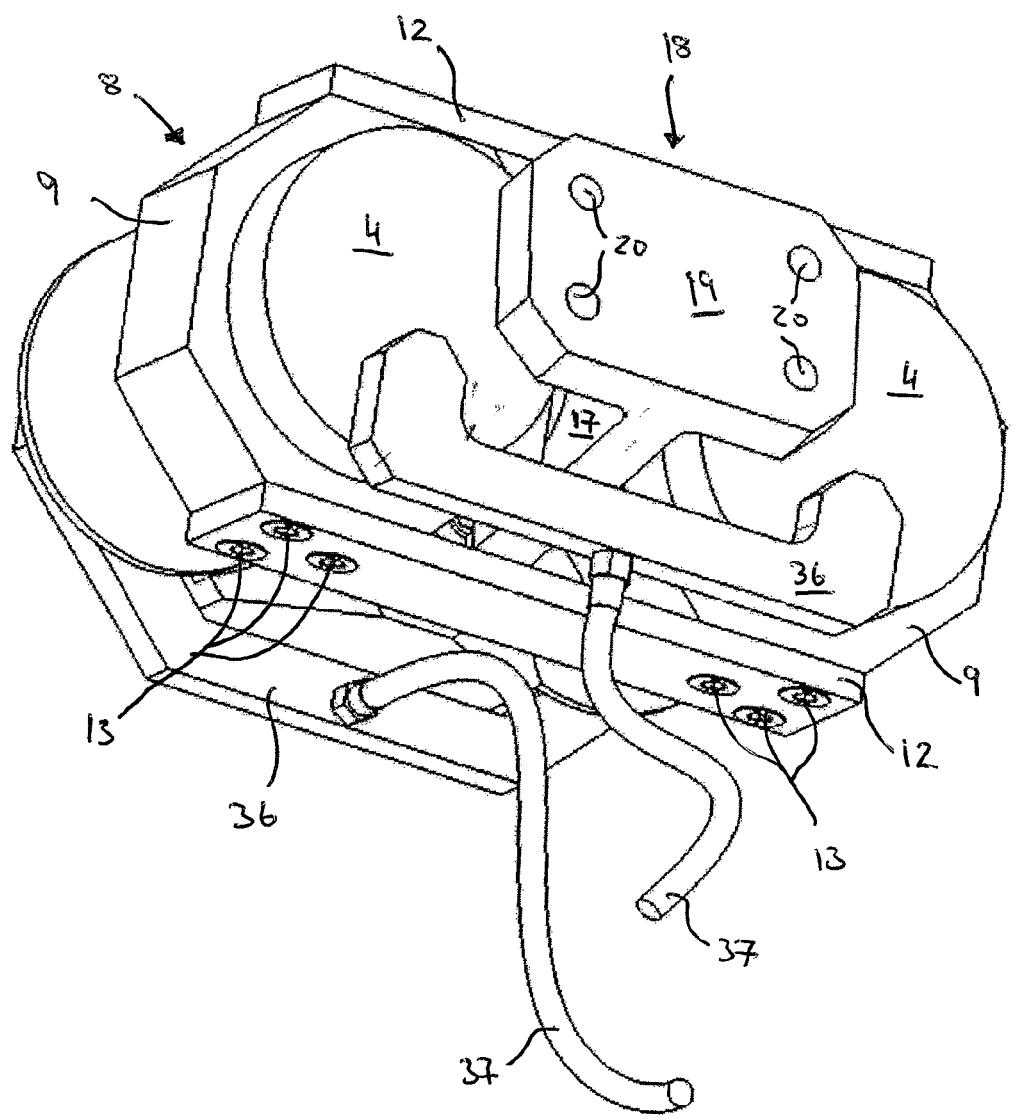
FIG. 2 is a rear perspective view of the actuator system of FIG. 1.
Figure 3:
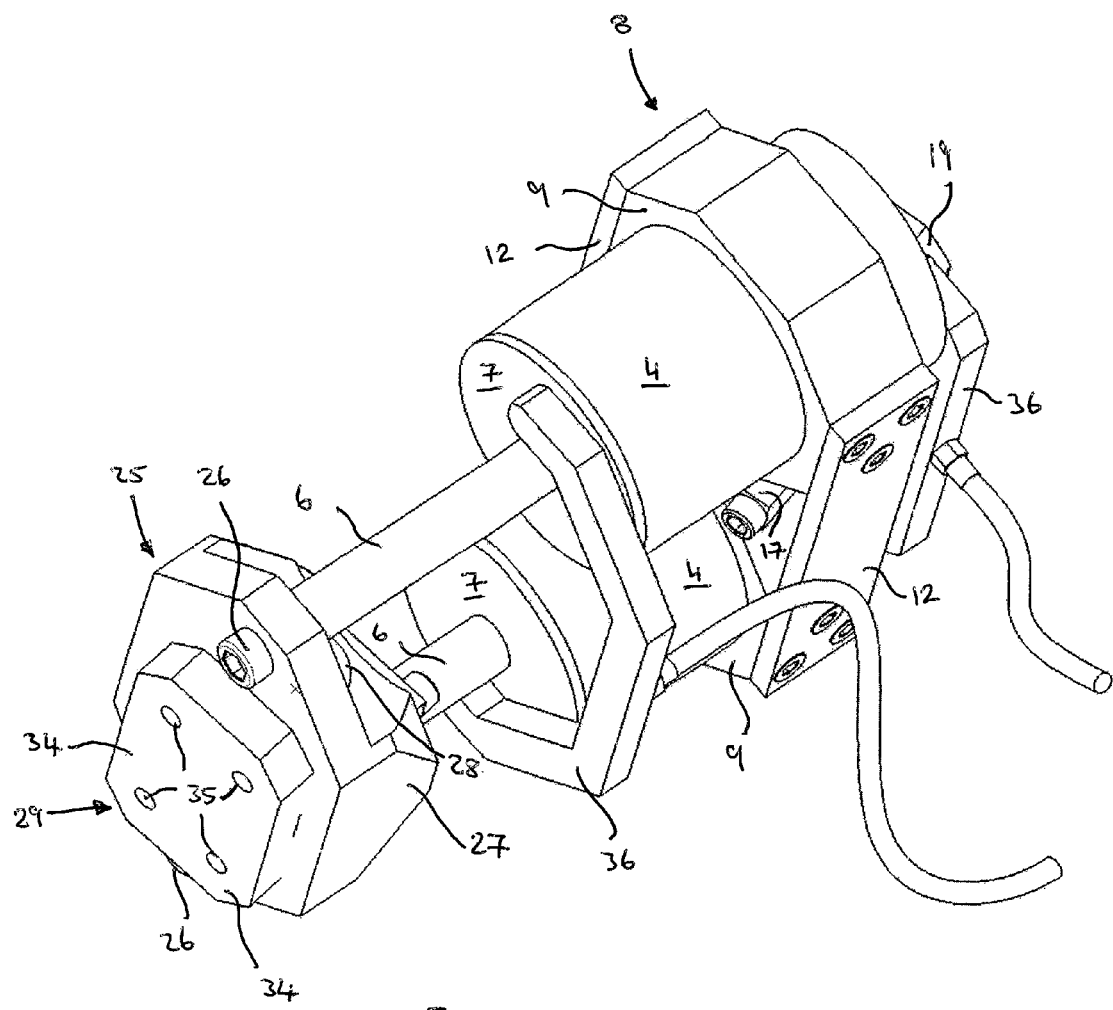
FIG. 3 is a front perspective view of the actuator system shown in FIG. 1, but with the pistons of the hydraulic cylinders shown in their extended state.

Referring now to the drawings, there is shown in FIGS. 1 and 2 an actuator system assembly 1 including a bearing assembly according to a preferred embodiment of the invention. The actuator system assembly 1 comprises a pair of spaced hydraulic cylinders 3 whose longitudinal axes (A-A in FIG. 4) are arranged parallel to each other. Each cylinder 3 comprises a cylinder housing 4 with a piston 5 (see FIG. 4) slideably received in the cylinder housing 4 to drive a control surface (not shown) towards and away from an aircraft wing (not shown) as the piston 5 slides into and out of the cylinder housing 4 in response to changes in hydraulic pressure on one side of the piston 5. Each piston 5 has a shaft 6 that extends through a plate 7 closing an end of each cylinder housing 4.

Referring to the bearing assembly, it comprises a first movable support element 8 having a pair of collars 9 spaced from each other by a shaft 10, which is just visible in FIG. 4 between the collars 9. The collars 9 are sized so as to receive and mount hydraulic cylinder housings 4 close to one end, and with their longitudinal axes (A-A in FIG. 4) parallel to each other. The longitudinal axis of the shaft 10 (B-B in FIG. 4) intersects and extends perpendicular to the longitudinal axis A-A of each cylinder housing 4. The collars 9 and shaft 10 are all rigidly connected together and/or integrally formed so that there is no relative movement between them. The cylinders 4 are therefore held in fixed relative positions by the collars 9. To further reinforce and maintain the relative positions of the cylinders 4, two plates 12 extend between and are connected directly to the collars 9 at each end by screws 13.

A first part-spherical bearing element 14 has inner and outer race portions 14a, 14b. The inner race portion 14a is received on the shaft 10 and the outer race portion 14b is seated within an aperture 15 formed in an arm 17 of a first fixed support member 18 that has a flange 19 with apertures 20 for attaching the first fixed support member 18 to a structural part of a wing of an aircraft using bolts inserted through said apertures 20. Therefore, the first movable and fixed support members 8, 18 are coupled so that they can rotate relative to each other about the first part-spherical bearing 14.

It will be noted that the first fixed support member 18 may be formed in two parts 18a, 18b that attach to each other and together form the aperture 15 that encloses the first part-spherical bearing 14. The two parts 18a, 18b may be coupled using bolts 21a that locate in hollow dowels 21 in the arm 17 for accurate alignment between the two parts 18a, 18b. The bolts pass through the dowels 21 into the threaded arm 17 to provide purely a clamping force. It will be appreciated that the first spherical bearing 14 is located between the cylinders 4 and so does not contribute to an increase in the overall length of the assembly 1.

It is possible for only one end of the assembly 1 to be provided with a spherical bearing assembly of the invention that does not contribute to the overall length of the assembly to the same extent as a conventional assembly would. However, in a preferred embodiment, both ends of the system are equipped with a bearing assembly of the invention in which a part-spherical bearing is mounted and positioned between the cylinders 4 so as to provide maximum reduction in the overall length of the assembly. In this case, the bearing assembly further includes a second movable support member 25 which is attached to the ends of both pistons 6 using, for example, bolts 26. The pistons 5 are therefore constrained so that they slide in unison into and out of their respective cylinders 4.

The second movable support member 25 has a central region 27 that extends inwardly towards the cylinders 4 between the piston shafts 6. A generally rectangular shaped aperture 28 extends through the central region 27 in the same direction as the longitudinal axis A-A of the cylinders 3. A hole 28 also extends laterally, at right-angles to the longitudinal axis A-A, through the central region 27, intersecting the aperture 28.

A second fixed support member 29 has an arm 30 with an aperture 31 in which is received a second part-spherical bearing 32 having inner and outer bearing races 32a, 32b. The arm 30 may be formed in two parts 30a, 30b which together combine to form the aperture 31 and enclose the second part-spherical bearing 32. The two-parts of the arm 30 may be connected together using bolts 33. that locate in hollow dowels 33a in part 30b for accurate alignment between the two parts 30a, 30b. The bolts 33 pass through the dowels 33a into the threaded part 30b to provide purely a clamping force.

Once the second part-spherical bearing 32 has been located in the arm 30 with the outer bearing race 32b seated in the aperture 31, the arm 30 is inserted through the rectangular shaped aperture 28 in the central region 27 of the second movable support member 25 so that the second part-spherical bearing 32 is positioned in the aperture 28 in the central region and aligned with the holes 28. A pin 33b having a hollow female threaded shaft 34 is then inserted through the holes 28 and second part-spherical bearing 32 and retained in place by a plug 35 having a threaded male shaft 35a. The female thread in the shaft 34 is engaged with the male thread on the shaft 35a. The two components together act as one but are expected to fail individually and so act as a failsafe pin arrangement. The inner race 32a is thereby mounted on the shaft 34 and the second part-spherical bearing 32 is mounted in position within the aperture 28 of the central region 27 between the ends of the piston shafts 6. Consequently, the second movable and fixed support members 25, 29 are now connected via the second part-spherical bearing 32 so that they can rotate relative to each other about the second part-spherical bearing 32. It will be appreciated that the arm 30 is a relatively loose fit in the rectangular shaped aperture 28 so that there is sufficient clearance to enable relative rotation between the second movable and fixed support members 25, 29 through a limited angular range of movement.

The second fixed support member 29 has a flange 34 at the free end of the arm 30 remote from the aperture 28 that receives the second part-spherical bearing 32 to enable the second fixed support member 29 to be attached to a control surface of an aircraft using bolts that extend through apertures 35 in the flange 34.

The cylinders 3 are configured so that they operate in tandem and so that the piston 5 associated with each cylinder housing 4 moves by exactly the same amount. Rigid twinning of the two cylinders 4 ensures that any asymmetry is eliminated or reduced. However, it is also envisaged that front and rear balance manifolds can be utilised to ensure that cylinders 4 do not fight each other and pressure equalisation is maintained. The use of a balanced manifold could also provide faster actuator response times.

With reference to the drawings, a manifold 36 is attached to each end of the cylinder housing 4. Each manifold 36 has a fluid flow conduit therethrough to connect both cylinder housings 4 to a single fluid supply pipe 37 attached to each manifold 36. This ensures that exactly the same amount of fluid is pumped into, and withdrawn from, each cylinder housing 4. Movement of the pistons 5 may be monitored using a linear velocity displacement transducer (LVDT). If two LVDT's are used, feedback on each piston position can be obtained through a comparator. The comparator may be configured to actuate a shut-off valve in the event of any asymmetry between the cylinders 3. Alternatively, LVDT's could inform a twinned servo valve arrangement so that corrections are made on a continuous basis.

In one unillustrated modified embodiment, a spring may be located in each cylinder housing 4 to bias the pistons 5 to a neutral position in the absence of hydraulic pressure acting on the pistons 5.

It will be appreciated that as at least one spherical bearing element 14, 32 is now disposed between a pair of cylinders 3, rather than protruding from one end of the assembly. Therefore, the overall length of the actuator system 1 is reduced providing more design flexibility. Although the width of the actuator 1 is increased as a result of employing two cylinders 3 in side-by-side relation, the space in the across-wing direction is of less concern and so this is considered to be an acceptable compromise with the two cylinders 3 being more easily accommodated within the wing.

Reference is made above to movable and fixed support members. Movable support members are those that are coupled to and move together with the cylinders 3, whereas the fixed support members are those that are coupled to the aircraft structure or control surface.

It will be appreciated that the foregoing description is given by way of example only and that modifications may be made to the support assembly of the present invention without departing from the scope of the appended claims.

The invention claimed is:

1. An actuator system for controlling the deployment of a control surface from a wing of an aircraft, said system comprising;
    a pair of spaced apart parallel actuators, each actuator comprising a hydraulic cylinder and a piston slideably received in the cylinder; and
    a bearing assembly for mounting said pair of spaced parallel actuators between said wing and said control surface so that the actuators control deployment of said control surface from the wing in tandem, the bearing assembly comprising:
    a fixed member for attachment to said aircraft, and
    a movable member, said movable member is attachable to said hydraulic cylinders and configured to pivot together with said actuators about a part-spherical bearing and said bearing assembly is configured to locate the part-spherical bearing in a space between the hydraulic cylinders irrespective of the position of the pistons relative to the cylinders in said actuators.

2. An actuator system according to claim 1, wherein said moveable member includes a shaft that extends across the space between the hydraulic cylinders, and said part-spherical bearing is mounted to said shaft.

3. An actuator system according to claim 2, wherein a said fixed member comprises an arm that extends into the space between the cylinders, the arm having an opening that forms a bearing seat to receive the part-spherical bearing mounted on the shaft of the movable member such that the fixed and movable members are rotatable relative to each other about the part-spherical bearing.

4. An actuator system according to claim 3, wherein the arm of the fixed member is formed in two separable parts that combine to form the bearing seat and enclose the part-spherical bearing.

5. An actuator system according to claim 4, wherein the fixed member has a flange at one end remote from the bearing seat, the flange having means to enable the arm to be fixed to the aircraft.

6. An actuator system according to claim 2, wherein the movable member comprises a collar at each end of the shaft to receive a cylinder of each actuator in respective collars.

7. An actuator system according to claim 6, wherein a reinforcing plate is coupled to, and extends between, each collar.

8. An actuator system according to claim 2, wherein a second movable member is attached to a free end of each piston extending from a respective cylinders such that the pistons slide in unison into and out of respective cylinders.

9. An actuator system according to claim 8, wherein said second movable member has a central region extending between the pistons and an aperture extending through said central region to receive and mount a second part-spherical bearing between said pistons.

10. An actuator system according to claim 9, comprising a hole in the central region to receive and mount a pin extending laterally through the aperture, the second part-spherical bearing being mountable on the pin.

11. An actuator system according to claim 9, wherein a second fixed member comprises an arm configured to extend into the aperture in the central region of the second movable member, the arm having an opening that forms a bearing seat to receive the second part-spherical bearing mounted in said aperture in the second movable member such that the second fixed and movable members rotate relative to each other about the second part-spherical bearing.

12. An actuator system according to claim 11, wherein the arm of the second fixed member is formed in two separable parts that combine to form the bearing seat and enclose the second part-spherical bearing.

13. An actuator system according to claim 11, wherein the second fixed member has a flange at one end remote from the bearing seat, the flange having means to enable the arm to be attached to the aircraft.

14. An actuator assembly according to claim 1, comprising a manifold to fluidly connect a single fluid source to both cylinders.

15. An actuator system according to claim 14, wherein said manifold comprises a separate manifold mounted at each end of the pair of cylinders.

16. An actuator system according to claim 14, wherein the ends of each cylinder is closed by a plate and the manifold is attachable to the plates at one end of the pair of cylinders so as to extend therebetween, the plates each having a passage therethrough to fluidly connect the manifold to the cylinders.

* * * * *